(12) United States Patent
Mowery et al.

(10) Patent No.: US 6,970,964 B2
(45) Date of Patent: Nov. 29, 2005

(54) USING PCMCIA/PCI DRIVERS TO CONTROL USB PORTS

(75) Inventors: Keith R. Mowery, Plano, TX (US); Jeffrey H. Enoch, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 276 days.

(21) Appl. No.: 10/405,289

(22) Filed: Mar. 28, 2003

(65) Prior Publication Data

US 2004/0205273 A1 Oct. 14, 2004

(51) Int. Cl.[7] .................. G06F 13/00; G06F 13/20; H05K 7/10
(52) U.S. Cl. ................ 710/302; 710/301; 710/313
(58) Field of Search ................. 710/301, 302, 710/313

(56) References Cited

U.S. PATENT DOCUMENTS

| 5,708,799 | A | * | 1/1998 | Gafken et al. ............ 710/301 |
| 5,784,628 | A | * | 7/1998 | Reneris .................... 713/300 |
| 6,567,273 | B1 | * | 5/2003 | Liu et al. .................. 361/737 |
| 6,684,283 | B1 | * | 1/2004 | Harris et al. .............. 710/302 |

OTHER PUBLICATIONS

"CardBay—Next generation of PC card standard"—Arthur Huang—Jul., 2001 http://www.eetasia.com/ARTICLES/2001JUL/2001JUL02_MEM_CT_TAC2.PDF.*

* cited by examiner

Primary Examiner—Rehana Perveen
Assistant Examiner—Jeremy S. Cerullo
(74) Attorney, Agent, or Firm—J. Dennis Moore; W. James Brady, III; Frederick J. Telecky, Jr.

(57) ABSTRACT

A filter driver (125) can communicate with the USB stack and controller and with the CardBay, CardBus, and flash-media stack and controller. This can allow the use of a CardBay card in a CardBus socket in a manner that is transparent to the user.

20 Claims, 1 Drawing Sheet

USING PCMCIA/PCI DRIVERS TO CONTROL USB PORTS

FIELD OF THE INVENTION

The invention relates generally to personal computers and, more particularly, to using PCMCIA/PCI drivers to control USB ports.

BACKGROUND OF THE INVENTION

Personal computer ("PC") card technology is used in mobile computing platforms. The PC card family includes 16-bit PC cards to serve the needs of modest performance and older (legacy) PC card applications, as well as the 32-bit PCI-like CardBus PC cards used to satisfy the most demanding of today's computing add-in needs. As portable platforms continue to diversify in form-factor and decrease in power consumption, add-in card technologies need to reflect the compact and energy-efficient portable host systems in which they are used. Mobile systems need user-installable, modular add-in capability, in both card and storage form-factors, in order to support standardized system configuration for corporate information technology departments and rapidly changing application domains, such as Internet-based processing.

Mobile systems are also evolving to input/output ("I/O") technology based on popular serial buses, such as the Universal Serial Bus ("USB"). Accompanying this change is a drive to "layer" future add-in capabilities onto these newer buses. CardBus has been the standard for add-in capabilities for today's PCI-based systems. However, as USB gains popularity, a new PC card standard has been required. CardBay has emerged as that standard. CardBay offers the expected set of PC card functions, along with enhancements that meet the changing needs of mobile technology, while maintaining backward compatibility to legacy PC cards.

CardBay is an implementation of USB devices at a CardBus card socket. CardBay essentially substitutes a USB interface for the existing CardBus interface while retaining the CardBus physical connector and PC card format. Therefore, instead of inserting a CardBus card into a CardBus socket, a user can insert a CardBay (USB 1.1 or USB 2.0) card into the CardBus socket. However, there are problems related to using a CardBay card in a CardBus socket. One major problem is the routing of USB ports through CardBus. A second major problem is that USB does not inherently "talk" with CardBus PCMCIA/PCI drivers (i.e., the USB driver stack is not related to the PCMCIA or PCI driver functions). Other problems related to using a Cardbay card in a CardBus socket are: recognizing when a CardBay card is present, knowing which USB port to enable, sending an "enable" command for the boot sequence, and USB stack interoperability.

To date, these problems have only been addressed through hardware solutions. For example, one hardware solution runs a switch between the USB chip and the CardBus chip, allowing for physical power on and off of the device. A second hardware solution allows for the addition of four (4) pins to the CardBus pins, isolating the CardBus chip from CardBay. There are currently no software solutions addressing the problems related to using a CardBay card in a CardBus socket. A software solution could be implemented at relatively low costs, would not require any space modifications, and can work without modifications to existing operating systems.

It is therefore desirable to provide a solution that enables the use of a CardBay card in a CardBus socket at a relatively low cost, without requiring space modifications, and capable of working without modifications to existing operating systems. Exemplary embodiments of the present invention can provide this by the inclusion of a filter driver capable of communicating with the USB stack and controller and with the CardBay, CardBus, and flashmedia stack and controller.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which.

DETAILED DESCRIPTION

While the making and using of various embodiments of the present invention are discussed herein in terms of Universal Serial Buses ("USB"), CardBay, CardBus and flashmedia, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention enables the use of a CardBay card in a CardBus socket at a relatively low cost, without requiring space modifications, and capable of working without modifications to existing operating systems. Exemplary embodiments of the present invention can provide this by the inclusion of a filter driver capable of communicating with the USB stack and controller and with the CardBay, CardBus, and flashmedia stack and controller.

Figure 1:
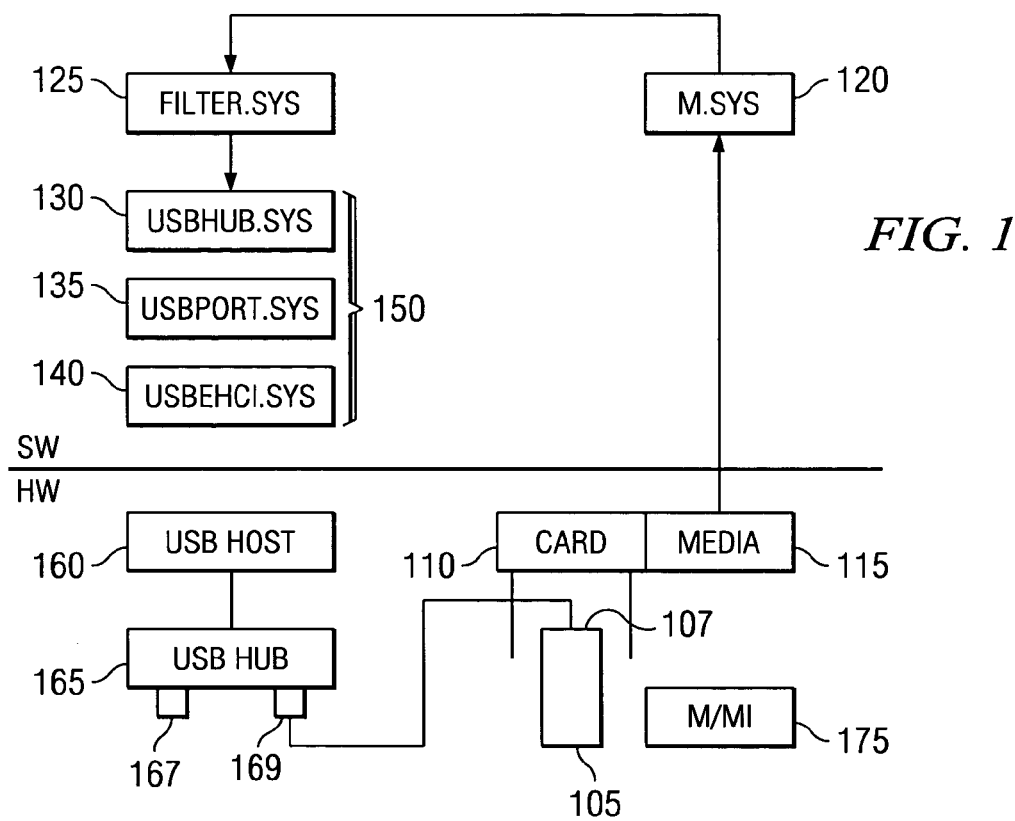
FIG. 1 diagrammatically illustrates exemplary embodiments of a mobile computing device in accordance with the present invention.

FIG. 1 diagrammatically illustrates pertinent portions of exemplary embodiments of a computing device, e.g. a fixed site or mobile computing device, in accordance with the present invention. Examples of computing devices include: laptops, notebooks, PDAs, and desktops. On the hardware ("HW") side, card block 110 and media block 115 perform respective functions of a multifunction PCI device, while USB Hub 165, with ports 167 and 169, and USB Host 160 can be conventional components. USB Hub 165 and USB Host 160 together can be considered to form a USB controller. Card 105, such as a CardBay card, can be inserted into card slot 107, such as a CardBus slot, which interfaces directly with a port of card block 110. In accordance with exemplary embodiments of the present invention, media block 115 can indicate to its driver on the media stack, M.SYS 120 on the software ("SW") side, the type of card 105 inserted into card slot 107. This can be determined by, for example, reading a card type register, such as a CardBay controller register, as conventionally known in the art. Drivers USBHUB.SYS 130, USBPORT.SYS 135 and USBEHCI.SYS 140 (collectively drivers 150), also on the SW side, can all be standard operating system drivers. In accordance with exemplary embodiments of the present invention, M.SYS 120 can send an enable/disable command to filter driver, FILTER.SYS 125. FILTER.SYS 125 can then send a command to USBHUB.SYS 130 to (1) determine which of its USB ports is connected to card slot 107 and (2) enable/disable that USB port, (port 169, in the FIG. 1 example). Drivers 150 can use conventional operations to effectuate the aforementioned identification and enablement/disablement of a USB port, such as port 169. The use of a filter driver to send a command to a first software driver stack in response to a command received from a second software driver stack is generally known to workers in the art.

The drivers on the SW side of FIG. 1 are implemented by a suitable data processor, for example a microprocessor in some embodiments. A man/machine interface, coupled to the data processor and illustrated by M/MI 175 (e.g., a keyboard, mouse, visual monitor, and microphone), allows a user to communicate with the data processor.

Figure 2:
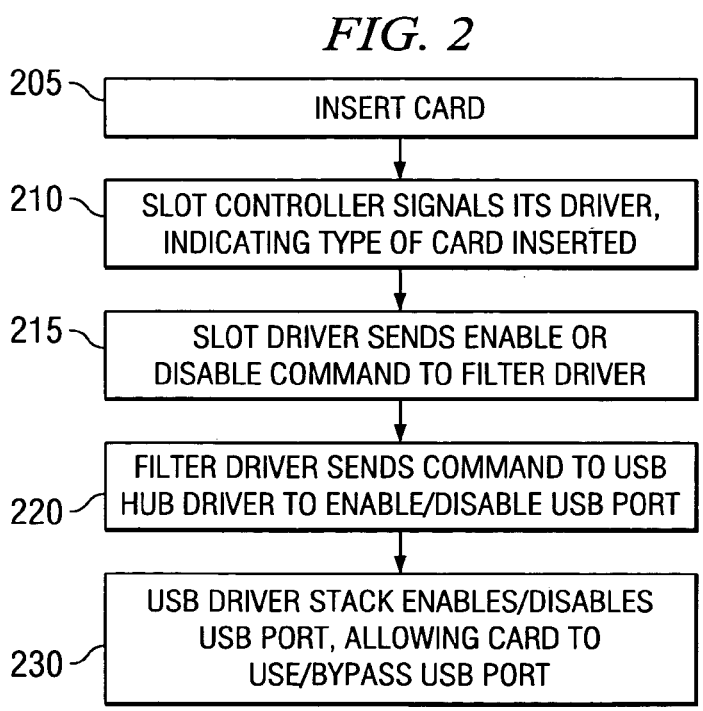
FIG. 2 illustrates an exemplary flow chart of events in accordance with the present invention.

FIG. 2 illustrates an exemplary flow chart of events in accordance with the present invention. In block 205, a card is inserted into a card slot, such as card slot 107 (FIG. 1), of a computing device. The inserted card can be, for example, a CardBay card while the slot can be, for example, a CardBus slot. In block 210, after the insertion of a card in block 205, the slot controller, such as the combination of card block 110 and media block 115 (FIG. 1), can signal its driver, such as M.SYS 120 (FIG. 1), indicating the type of card inserted. Based on the type of card inserted and the type of slot, in block 215, the slot driver can send an enable or disable command to a filter driver, such as FILTER.SYS 125 (FIG. 1). For example, if a CardBay card has been inserted into a CardBus slot, then the connected USB port, such as port 169 (FIG. 1), should be enabled so the CardBay card can utilize the USB port. Next, in block 220, the filter driver, such as FILTER.SYS 125 (FIG. 1), can then send a command to the USB hub driver, such as USBHUB.SYS 130 (FIG. 1), indicating whether the connected USB port should be enabled or disabled. Finally, in block 230, standard USB hub driver, such as USBHUB.SYS 130 (FIG. 1), with its associated standard drivers, such as USBPORT.SYS 135 (FIG. 1) and USBEHCI.SYS 140 (FIG. 1), can use conventional operations to identify and effectuate enablement/disablement of the connected USB port, such as port 169 (FIG. 1).

In some exemplary embodiments, a second filter driver can also be added to the media stack.

Although exemplary embodiments of the present invention have been described in detail, it will be understood by those skilled in the art that various modifications can be made therein without departing from the spirit and scope of the invention as set forth in the appended claims.

What is claimed is:

1. A data processing apparatus, comprising:
   a connector for receiving a media card;
   a first communication port coupled to said connector and operable when a media card is in said connector for communicating with the media card according to a first communication interface;
   a second communication port coupled to said connector and operable when a media card is in said connector for communicating with the media card according to a second communication interface that differs from said first communication interface;
   a data processor coupled to said first and second communication ports for communication therewith, said data processor for implementing first and second software drivers which are operatively associated with said first and second communication ports, respectively;
   said first software driver cooperable with said first communication port when a media card is in said connector for determining whether the media card communicates according to said second communication interface; and
   said data processor for implementing a third software driver that interfaces between said first and second software drivers, said third software driver for receiving from said first software driver an indication that a media card in said connector communicates according to said second communication interface, said third software driver responsive to said indication for directing said second software driver to enable said second communication port.

2. The apparatus of claim 1, wherein said first software driver is one of a PCMCIA driver and a PCI driver.

3. The apparatus of claim 2, wherein said second software driver is a USB driver.

4. The apparatus of claim 3, wherein said connector is for receiving either one of a card conforming with the CardBay card specification and a card conforming with the CardBus card specification of the PC Card Standard, version 8.0, of the PCMCIA.

5. The apparatus of claim 2, wherein said connector is for receiving either one of a card conforming with the CardBay card specification and a card conforming with the CardBus card specification, both specifications of the PC Card Standard, version 8.0, of the PCMCIA.

6. The apparatus of claim 1, wherein said connector is for receiving either one of a card conforming with the CardBay card specification and a card conforming with the CardBus card specification, both specifications of the PC Card Standard, version 8.0, of the PCMCIA.

7. The apparatus of claim 1, wherein said second software driver is a USB driver.

8. The apparatus of claim 7, wherein said connector is for receiving either one of a card conforming with the CardBay card specification and a card conforming with the CardBus card specification, both specifications of the PC Card Standard, version 8.0, of the PCMCIA.

9. The apparatus of claim 1, wherein said third software driver is for receiving from said first software driver an indication that a media card in said connector does not communicate according to said second communication interface, said third software driver responsive to said last-mentioned indication for directing said second software driver to disable said second communication port.

10. The apparatus of claim 1, wherein said connector is for receiving one of a PCMCIA card and a PCI card.

11. The apparatus of claim 1, wherein said data processor includes a microprocessor.

12. A data processing apparatus, comprising:
    a connector for receiving a media card;
    a first communication port coupled to said connector and operable when a media card is in said connector for communicating with the media card according to a first communication interface;
    a second communication port coupled to said connector and operable when a media card is in said connector for communicating with the media card according to a second communication interface that differs from said first communication interface;
    a data processor coupled to said first and second communication ports for communication therewith, said data processor for implementing first and second software drivers which are operatively associated with said first and second communication ports, respectively;
    said first software driver cooperable with said first communication port when a media card is in said connector for determining whether the media card communicates according to said second communication interface;

said data processor for implementing a third software driver that interfaces between said first and second software drivers, said third software driver for receiving from said first software driver an indication that a media card in said connector communicates according to said second communication interface, said third software driver responsive to said indication for directing said second software driver to enable said second communication port; and a man/machine interface coupled to said data processor for permitting communication between said data processor and a user.

13. The apparatus of claim 12, wherein said first software driver is one of a PCMCIA driver and a PCI driver.

14. The apparatus of claim 12, wherein said connector is for receiving either one of a card conforming with the CardBay card specification and a card conforming with the CardBus card specification, both specifications of the PC Card Standard, version 8.0, of the PCMCIA.

15. The apparatus of claim 12, wherein said second software driver is a USB driver.

16. The apparatus of claim 12, wherein said third software driver is for receiving from said first software driver an indication that a media card in said connector does not communicate according to said second communication interface, said third software driver responsive to said last-mentioned indication for directing said second software driver to disable said second communication port.

17. The apparatus of claim 12, wherein said connector is for receiving one of a PCMCIA card and a PCI card.

18. The apparatus of claim 12, wherein said data processor includes a microprocessor.

19. The apparatus of claim 12, provided as one of a laptop computer, a notebook computer, a personal digital assistant and a desktop computer.

20. The apparatus of claim 12, wherein said man/machine interface includes one of a tactile interface and a visual interface.

* * * * *